Nov. 4, 1941.                E. S. MILLER                2,261,774
                           LUBRICANT ATOMIZER
                          Filed Nov. 30, 1939
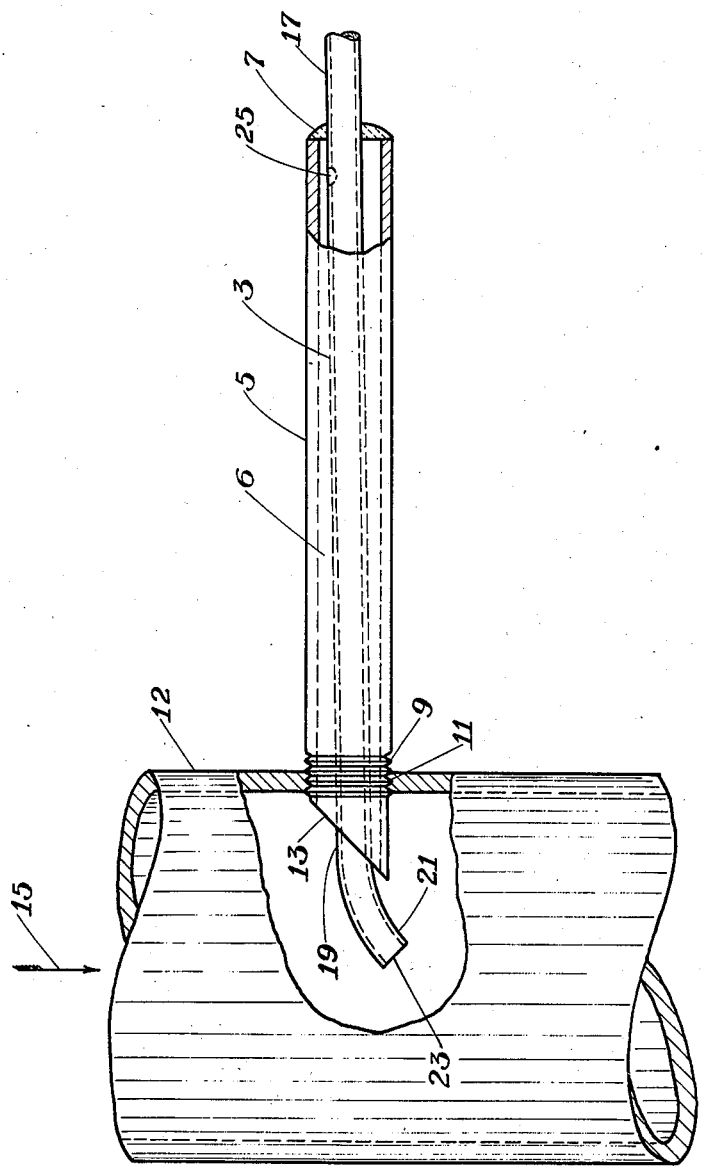
INVENTOR.
*Ernest S. Miller*
BY *Edward H. Lang*
ATTORNEY.

Patented Nov. 4, 1941

2,261,774

UNITED STATES PATENT OFFICE 2,261,774

LUBRICANT ATOMIZER

Ernest S. Miller, Columbus, Ohio, assignor to The Pure Oil Company, Chicago, Ill., a corporation of Ohio Application November 30, 1939, Serial No. 306,908

5 Claims. (Cl. 184—55)

This invention relates to the art of lubrication and more particularly to lubricant atomizers useful in the lubrication of steam driven prime movers.

It is customary to lubricate steam driven prime movers by injecting a suitable lubricant into the steam feed line which supplies steam to the cylinders. Since steam comes into intimate contact with practically all moving parts within the cylinder and steam chest, it is a very convenient medium for carrying the lubricant to the surfaces that are in frictional engagement. For most efficient lubrication it is essential that the lubricant, which is generally a mineral cylinder oil, be completely atomized throughout the entire volume of steam entering the steam chests and cylinders. When mineral cylinder oils are used as lubricants, animal or vegetable oils are frequently compounded with the mineral oils in order to improve the lubricating properties of the oils. Generally speaking, the higher the pressure and temperature of the steam, the thinner the lubricant will become upon introduction into the steam line and the easier and more completely will be the atomization. For this reason difficulties in lubricant atomization are much more frequent in low pressure, low temperature operations.

Some of the additional factors which govern the completeness of the atomization of lubricants into steam feed lines are: velocity of the steam, moisture content and degree of super heat of the steam, the point of introduction of the lubricant and the method and device by which the lubricant is introduced into the steam line. The method in which the lubricant is introduced into the steam line is largely dependent on the particular device used for this purpose.

It is an object of this invention to provide a new and improved lubricant atomizing device.

It is another object of this invention to provide a device for preheating lubricant prior to atomizing it into the steam line.

It is a further object of this invention to provide a device for emulsifying lubricant with steam condensate and atomizing the emulsion into a steam feed line.

It is a still further object of this invention to provide a highly efficient lubricant atomizer of greatly simplified construction.

Other objects and advantages will be apparent from the accompanying description and drawing of which the single figure is a side elevational view, partly in section, of a device illustrating the invention.

In the particular embodiment selected to illustrate the invention, a hollow cylindrical pipe 3 of relatively small diameter is placed within a hollow cylindrical pipe 5 of larger diameter in such a manner that there is an annular space 6 between the smaller pipe and the larger pipe, the relative lengths of the pipes being so adjusted that the smaller pipe 3 projects from both ends of the larger pipe 5. The annular space 6 between the smaller pipe 3 and larger pipe 5 is closed at one end 7 by means of brazing, welding, attaching a screw fitting or by other suitable means. The larger pipe is externally threaded at 9 and is screwed into the threaded opening 11 in the wall of a conventional steam feed pipe 12 which feeds steam to a prime mover, not shown. The pipe 5 is mounted in such a manner that the quill shaped tip 13 projects into the steam feed pipe a short distance, preferably about ⅛ to ⅓ of the diameter of pipe 12, and with the open portion of the quill facing upstream with respect to the direction of flow of the steam which flows in the direction of the arrow 15. When pipe 5 is threaded into the wall of the steam line, it is preferably in a substantially horizontal position and when thus mounted, the opposite end 17 of the straight portion of pipe 3 is preferably at a slightly higher level than the end 19. The extreme end portion 21 of pipe 3 is curved in the direction of flow of the steam and has a quill tip 23, the open portion of the quill facing downstream with respect to the direction of flow of the steam. An opening such as orifice 25 is drilled or otherwise cut through preferably the top wall of pipe 3. The end 17 of pipe 3 is connected with a lubricator, preferably of the force feed type, which is not shown.

In operation, a portion of the steam from pipe 12 flowing to a prime mover, is diverted by the quill tipped end 13 of the larger pipe 5 and by the vacuum effect of steam passing around the tip 23 of pipe 3 which creates a suction in pipe 3 and in the annular space 6. The diverted steam passes through the annular passage 6 between pipes 3 and 5 into orifice 25 and thence into the smaller pipe 3 where it meets lubricant forced to this point through the end 17 of the pipe 3 by a force feed lubricator. Since most of the pipe 5 is outside of the steam feed pipe 12 and is cooled by air at atmospheric temperature, an appreciable amount of condensation occurs, so that regardless of the temperature of the steam which passes through pipe 12, both steam and liquid condensate pass through the orifice 25 of pipe 3. The condensate emulsifies at this point with lubricant supplied by the force feed lubricator, due to the turbulence of flow of the steam and condensate through the orifice. The flow of steam and lubricant emulsion through pipe 3 may be assisted by a downward slope of pipe 3 and flows toward the tip 23. The temperature of the emulsion increases as it flows toward the tip 23 due to heat transfer from the wall of pipe 3, the heat being supplied by steam flowing through the annular space 6 which surrounds pipe 3. The increase in temperature diminishes the viscosity of the lubricant, increases the degree of dispersion of the lubricant in the emulsion and permits easier and more complete atomization of the lubricant at tip 23 than would otherwise be possible. The distance between the orifice 25 and the tip 23 is such that the lubricant will be substantially completely emulsified by the time it reaches the tip 23. The velocity of the steam flow through feed pipe 12 around the tip 23 is such that there is a vacuum effect produced in pipe 3 and the lubricant emulsion is pulled out of the tip 23 and atomized by the force of the steam flow into the main body of steam flowing to the prime mover. Since the lubricant has already been broken up into very fine particles by emulsification with condensate in pipe 3, the result of the action of the main body of steam at the tip 23 is to further break up and completely and thoroughly atomize the lubricant emulsion into all portions of the steam flowing through feed line 12. Due to the complete atomization of the emulsion a minimum amount of lubricant is required to obtain effective dispersion of lubricant throughout all portions of the steam fed to the prime mover and thus all of the frictionally engaged surfaces with which steam comes in contact are efficiently supplied with lubricant.

The length of the pipe 5 which extends outside of the wall of steam feed line 12 may be varied or insulation applied to pipe 5 in varying amounts in order to secure the desirable amount of condensate entering the orifice 25. The device is extremely simple and requires only a single threaded connection for mounting in a steam supply line. Tip 23 of pipe 3 extends beyond tip 13 of pipe 5 and into steam feed line 12. The distance which tip 23 projects into steam line 12 and the curvature of tip 23 are such as to produce a maximum vacuum effect in pipe 3. The tip 23 is preferably below the level of the bottom of pipe 5. In a specific example a very efficient lubricant atomizer was constructed, using standard ¾" pipe as the larger pipe and standard ⅜" pipe as the smaller pipe. The larger pipe was approximately 9" long, the smaller pipe approximately 12" long, the orifice in the top side of the smaller pipe approximately ¼" in diameter and the quill tips at an angle of approximately 45 degrees to horizontal.

While a description has been given of a specific form of the invention, it is not intended that the invention be limited thereby. Various changes and modifications within the scope of the invention may be obvious to those skilled in the art and are intended to be a part of this invention.

I claim:

1. A device of the character described consisting of a hollow, elongated member, a second hollow elongated member of smaller cross-sectional area than said first mentioned member positioned within and having its ends extending beyond the ends of the latter, a seal adjacent one end of said first mentioned member sealing the space between said members and an opening in said member of smaller cross-sectional area at a point located within said first mentioned member, the space between said members being open at all points except at said seal.

2. A device of the character described consisting of a pipe, a second pipe of substantially smaller cross-sectional area than said first mentioned pipe positioned within and having its ends extending beyond the ends of the latter, a seal adjacent one end of said first mentioned pipe sealing the space between said pipes and a quill tip at the opposite end, an opening in said second pipe at a point within said first mentioned pipe and adjacent said seal, the end of said second mentioned pipe adjacent the quill tip being curved in a direction approximately opposite that of the open face of the quill tip so that the tip of the second mentioned pipe lies outside the line of prolongation of the wall of the first mentioned pipe.

3. In a device of the character described, the combination with a steam supply pipe, consisting of a hollow elongated member secured to the steam pipe and projecting therein crosswise, a second hollow elongated member of smaller cross-sectional area than said first mentioned member positioned within and having its ends extending beyond the ends of the latter thereby forming an annular space between the two members in open communication with said supply pipe, a closure adjacent the end of the first mentioned member opposite from that which projects into the steam pipe completely sealing the space between the elongated members, an opening in said second mentioned member at a point within said first mentioned member, means for forcing steam into said first mentioned member and means for supplying lubricant to said second mentioned member.

4. In a device of the character described, the combination with a steam supply pipe consisting of a pipe secured to the steam pipe and having a portion including a quill tip projecting crosswise inside it, a second pipe of substantially smaller diameter positioned within said first mentioned pipe and having its ends projecting beyond the ends of the latter thereby forming an annular space between the two members in open communication with said supply pipe, a closure adjacent the end of the first mentioned pipe, opposite from that which projects into the steam pipe, completely sealing the space between the pipes, an orifice in said second pipe at a point adjacent the closure, a curved portion adjacent the end of said second pipe projecting into said steam supply line, the curvature being of such form as to produce the maximum vacuum effect in said second pipe when steam flows through the steam supply pipe, and means for supplying lubricant to said second pipe.

5. A device of the character described consisting of a hollow elongated member, a second hollow elongated member of smaller cross-sectional area than said first mentioned member positioned within the latter and having its ends extending beyond the ends of the latter, a seal adjacent one end of said first mentioned member sealing the space between said members, the space between said members at the end opposite the seal being open and an opening in said member of smaller cross-sectional area at a point located within said first mentioned member.

ERNEST S. MILLER.